United States Patent
Kenigsberg et al.

(10) Patent No.: US 8,392,383 B2
(45) Date of Patent: Mar. 5, 2013

(54) SYSTEM AND METHOD FOR RECORDING FILES OF DATA

(75) Inventors: Eyal Kenigsberg, Yehud (IL); Michael Gopshtein, Yehud (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 345 days.

(21) Appl. No.: 12/239,433

(22) Filed: Sep. 26, 2008

(65) Prior Publication Data

US 2010/0082690 A1 Apr. 1, 2010

Related U.S. Application Data

(60) Provisional application No. 61/038,865, filed on Mar. 24, 2008.

(51) Int. Cl.
*G06F 7/00* (2006.01)
*G06F 17/30* (2006.01)

(52) U.S. Cl. ........... 707/693; 707/792
(58) Field of Classification Search ......... 707/610–680, 707/792, 693; 713/171, 201
See application file for complete search history.

(56) References Cited

U.S. PATENT DOCUMENTS

| | | | | |
|---|---|---|---|---|
| 2002/0178271 A1* | 11/2002 | Graham et al. | | 709/229 |
| 2003/0041095 A1* | 2/2003 | Konda et al. | | 709/201 |
| 2003/0097564 A1* | 5/2003 | Tewari et al. | | 713/171 |
| 2004/0199577 A1* | 10/2004 | Burd et al. | | 709/203 |
| 2005/0038880 A1* | 2/2005 | Danforth | | 709/222 |

* cited by examiner

*Primary Examiner* — Hosain Alam
*Assistant Examiner* — Navneet K Ahluwalia

(57) ABSTRACT

A method for recording files of data is disclosed. A file identifier indicative of a file is received. The file identifier is compared to a file conversion value. The file conversion value is determined to be a static file or a dynamic file. Static files are saved as the conversion value and dynamic files are saved as a unique identifier.

16 Claims, 6 Drawing Sheets

I # SYSTEM AND METHOD FOR RECORDING FILES OF DATA

CROSS REFERENCE TO RELATED APPLICATIONS

This Application claims the benefit of U.S. provisional patent application Ser. No. 61/038,865, filed Mar. 24, 2008, titled "A System And Method For Recording Files Of Data", which application is hereby incorporated by reference herein as if reproduced in full below.

BACKGROUND

Data to be recorded can be received from many sources. One example source is network traffic. Network traffic typically refers to the flow of data on a network. Network traffic can include a variety of examples such as the flow of data on a local network or on a wide area network. The Internet is an example of a wide area network, and network traffic on the Internet can include the flow of data related to the World Wide Web, peer to peer networks, electronic mail, or the like.

Network traffic is often recorded and later analyzed. In one example, network traffic relates to a server providing information to client systems on a wide area network such as the Internet. In this example, a customer may employ a host server connected to the wide area network to provide a web site or other files to client computers also connected to the wide area network. Clients can often access the web site or files with a program such as an Internet browser located at the client. In the case of the Internet, millions of client computers can access a popular host server over a period of time. The customer of this host server may be interested in such as information as to what sites or web pages are being accessed, when these sites or the pages are being accessed, how often, which files are being downloaded, and the like. In order to do this, network traffic is recorded to be replayed for a customer or to provide a customer with a list of network traffic. Customers can analyze this and other information to better improve their website, better understand the nature of the clients accessing the website, and determine other trends or glean additional information.

For an accurate and complete analysis of network traffic, many customers tend to prefer that all network traffic can be recorded. Information or files related to network traffic can be calculated into a conversion value and stored. Unfortunately, calculating a conversion value for each file is an expensive proposition because the calculation can require a relatively high amount of processing resources. This problem is exacerbated when there is much traffic to record.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other.

Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

An example application of this disclosure is for recording network traffic. Many other example applications for recording data are contemplated. This disclosure is not intended to be limited to recording network traffic.

Figure 1:
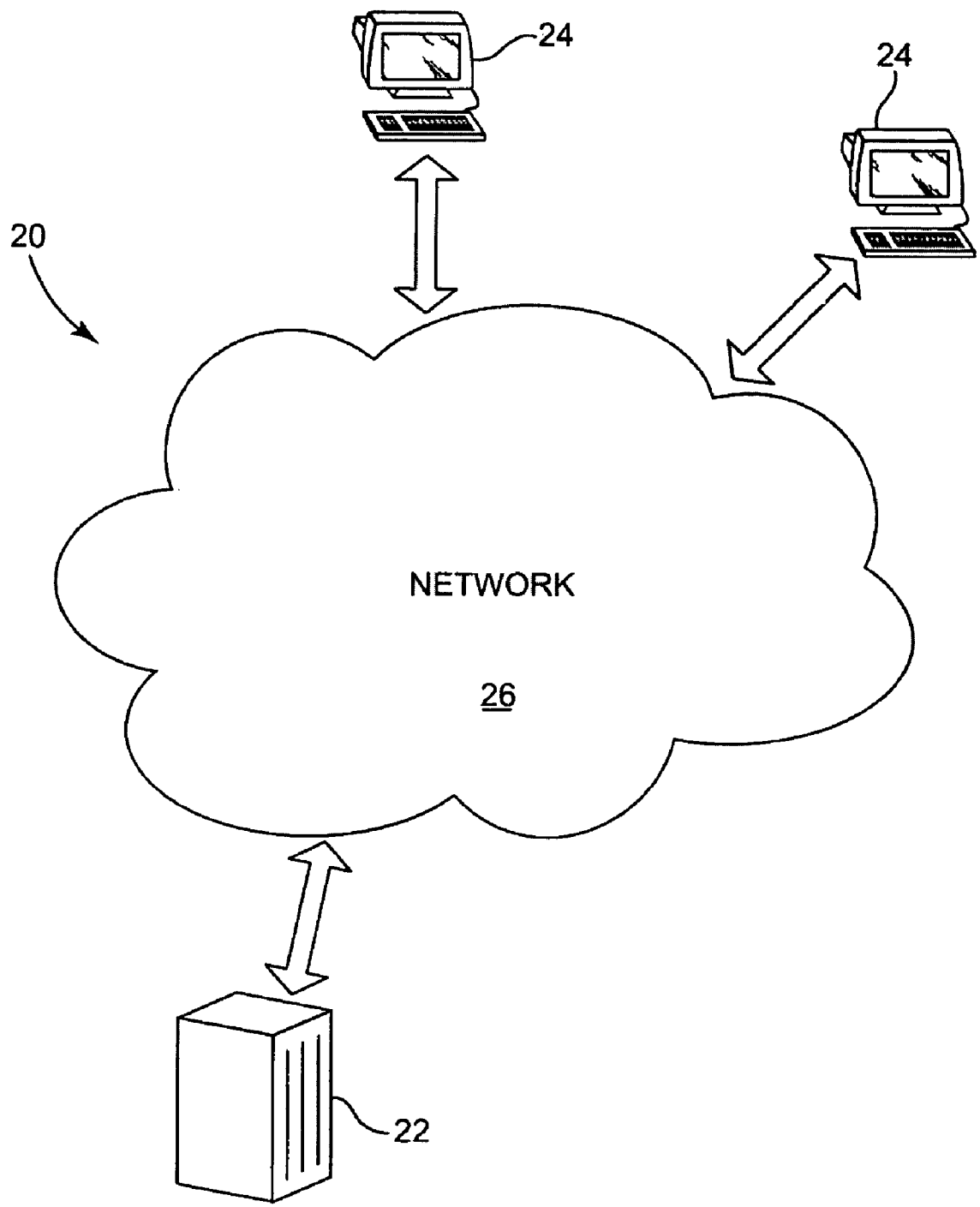
FIG. 1 is a schematic view of an example environment including an embodiment of the present disclosure.

FIG. 1 illustrates a computer network environment 20, which is an example environment suitable for an embodiment of the present disclosure. The computer network environment 20 includes at least one server 22 and a plurality of clients 24. The server 22 is connected to the clients through a computer network 26 such as a wide area network, the Internet, or the like. In the illustrated example, the clients 24 are able to access files provided by the server 22 over the network 26. Network traffic includes files provided from the server 22 to one or more clients 24.

As information or files are provided on the network, a straightforward method is to convert all of the files or information in the network traffic into a value representative of the information or files and then store these values. For example, all http (hypertext transfer protocol) files provided on the network can be converted into an MD5 (message-digest algorithm 5) value. MD5 is a widely-used hash function with many applications. In applications, the MD5 hash function assigns information regarding the http files into a hexadecimal number. This hexadecimal number can be considered to be the MD5 value, and it can be stored for each file provided on the network. A drawback of this method is that calculating an MD5 value for each file provided on the network requires a significant amount of processing resources in situations where network traffic is large.

Figure 2:
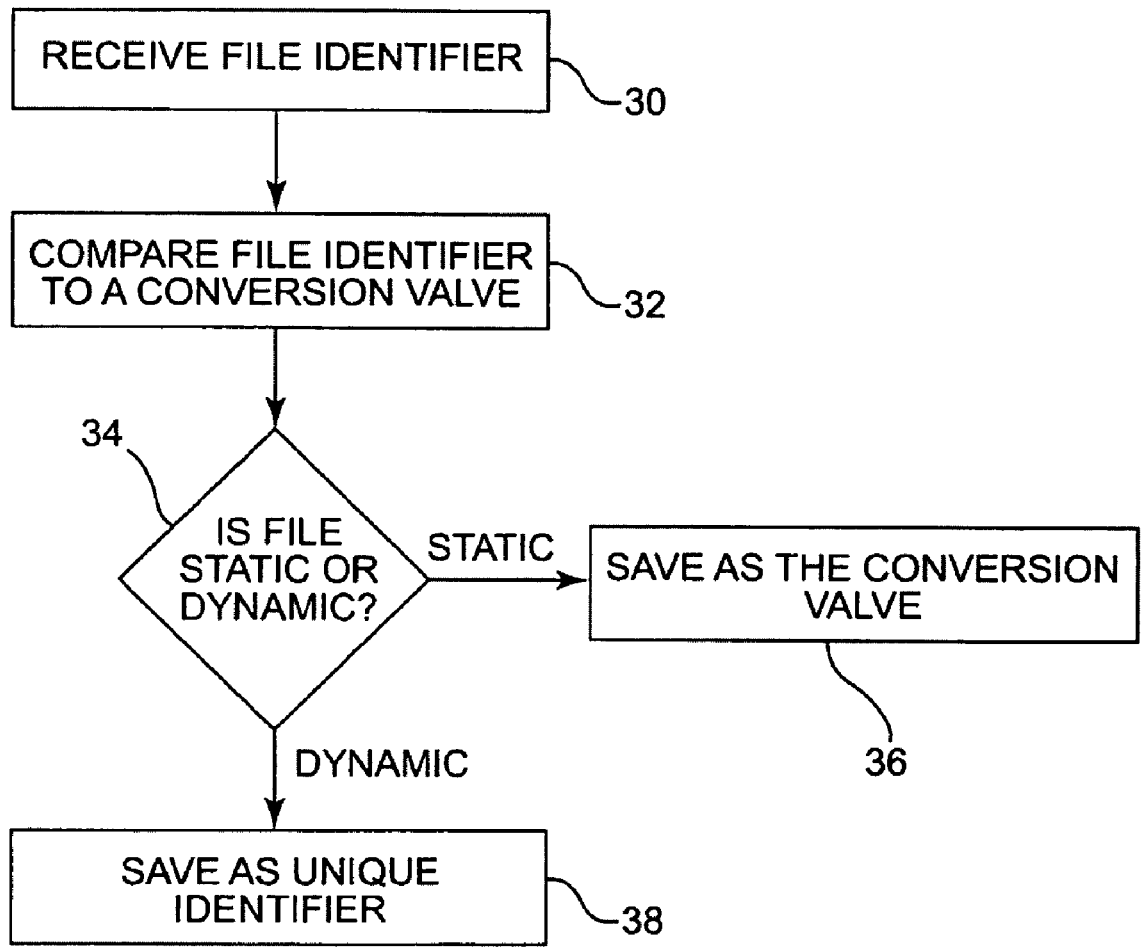
FIG. 2 is a flow chart of an embodiment of the present disclosure.

FIG. 2 illustrates an example method of recording the network traffic suitable for the environment of FIG. 1. In the example, a file identifier is obtained 30, where the file identifier is representative of a file provided from the server. The file identifier is compared to a conversion value corresponding with the file identifier 32. Based on the conversion value, the file identifier is determined to represent a static file or a dynamic file 34. If the file identifier represents a static file, the conversion value 36 is recorded such as in a database. On the other hand, if the file identifier represents a dynamic file, the file identifier is used to calculate a unique identifier, and the unique identifier is recorded in the database. In one example, the method can be performed with a processor and storage device located on or operably coupled to the server 22.

The file identifier as described above is used to initially distinguish files from each other. In this example, files including the same file identifier are identical. One example of a file identifier includes a Uniform Resource Identifier (URI) along with the data included in the file. Examples of a URI include Uniform Resource Locator (URL) that defines a resource by its location and a Uniform Resource Name (URN) that defines a resource by its name but does not necessarily describe where the resource can be found. In general, the URI is different for different files provided from the server. In some instances, the URI can represent more than one file provided from the server. In these instances, the file identifier can include information in addition to the URI and data. For example, the file identifier can include both a URI and a content length of the file, which can represent the size of the file. This added feature of content length provides an additional level of security that when two files include the same URI and the same content length that they are indeed identical. The file identifier will change if either one or both of the URI or the content length changes.

The conversion value of the file identifier can be a coded version of the file identifier. In the above example, the conversion value corresponds with the file identifier such that all instances of the same file identifier correspond with the same conversion value. One example of a conversion value is generated with a hash function such as MD5 (message-digest algorithm 5). For example, all http (hypertext transfer protocol) files provided on the network can be converted into an MD5 value. The MD5 hash function assigns information regarding the http files into a one hundred twenty-eight bit hexadecimal number, which can be one example of a conversion value. The MD5 hash function is relatively fast compared to many hash functions and rarely produces collisions for different inputs.

Figure 3:
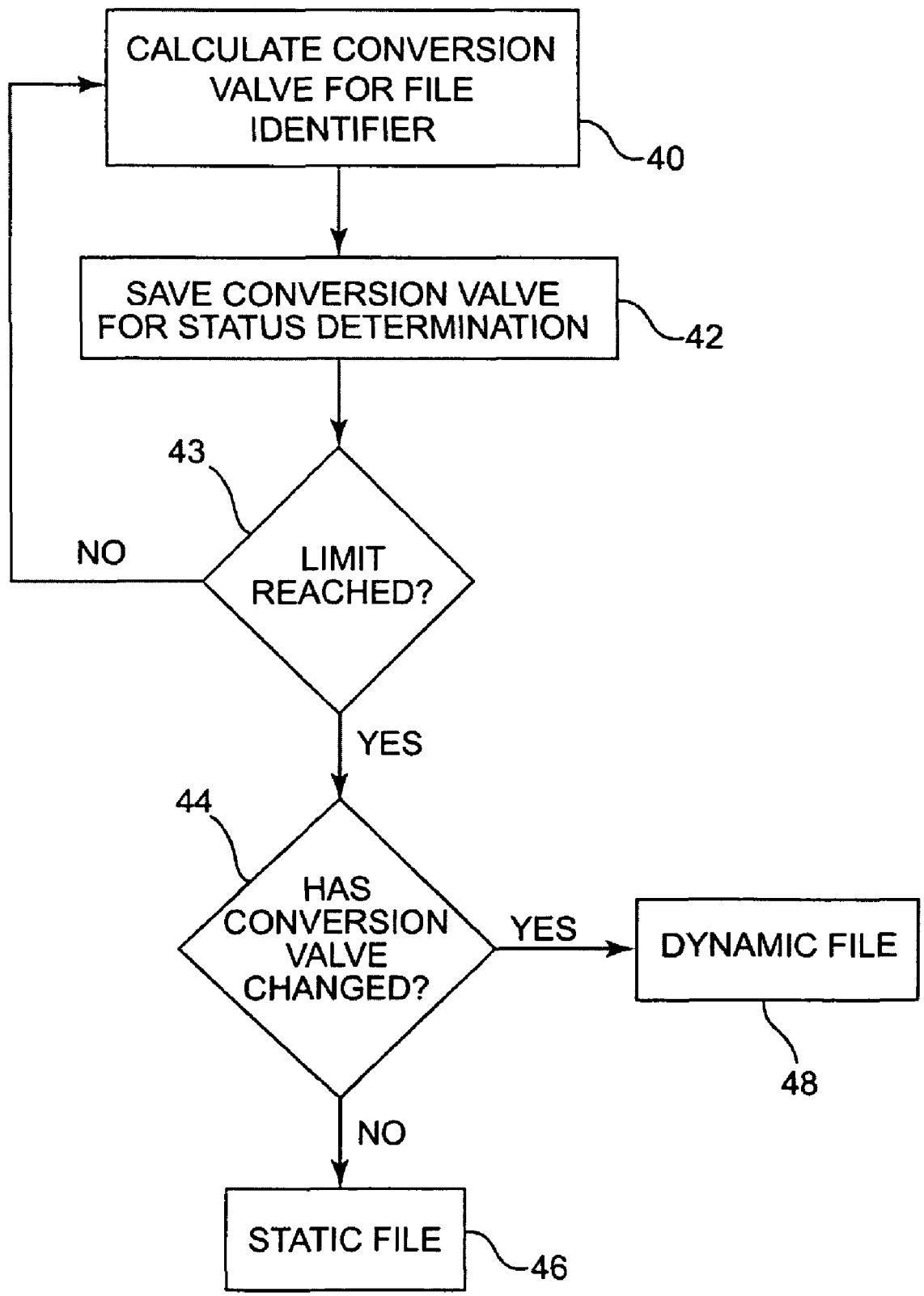
FIG. 3 is a flow chart of an embodiment of the present disclosure.

FIG. 3 illustrates an example of a method used to determine whether a file is static or dynamic as described above in 34. As files are accessed from the server, each file accessed is represented with a file identifier. The file identifiers are used to calculate file conversion values 40. For each time the file is accessed a conversion value is calculated and saved for later file status determination 42. The conversion values calculated this way can also be recorded in the database as network traffic. Once a file has been accessed a selected number of times 43, the conversion values are reviewed 44. In one example, the conversion values are considered after a file has been accessed one hundred times. If the conversion values from the last one hundred accesses are identical or generally the same, the file is designated as a static file 46. If the conversion values have changed in the last one hundred accesses, the file is designated as a dynamic file 48.

For illustration, types of static files can include vector-based animation files (such as files created with Adobe Flash), gifs, jpegs, and static html. Types of dynamic files can include dynamic html files such as those created by dynamic gifs, and the like.

Once a file status is designated as static or dynamic, its status as such can remain set until some pre-selected event that causes an expiration of the status of the file. One example of a pre-selected event can be a given time period. As an example, once a file is determined to be static or dynamic, its status as such will remain for an hour, or other period of time. Another pre-selected event can include a change or update to the server. Other pre-selected events can be imagined.

During the period while the file is designated as a static or dynamic file, the conversion values need not be calculated, thus saving valuable processing time. Instead, the conversion values can be mapped such that a given input of a file identifier will output the corresponding conversion value without calculation. Such a map can exist in a memory of a system operating the method, as a form of table look up, or the like.

The network traffic can be recorded into a database or other suitable memory. The conversion value of a static file is recorded in the database. If the file is a dynamic file, a unique identifier of the dynamic file is generated and recorded into the database. In this example, a unique identifier is (likely) different for all files. For example, a unique identifier can include a Globally Unique Identifier (GUID) that is used to identify the dynamic file being provided. In nearly all cases, the GUID is different for all files, although the remote possibility exists that the same GUID can be generated for the two separate files.

Recent testing has confirmed that the above described method requires significantly less computing resources than simply calculating an MD5 value for each example of network traffic. Redundant calculations are avoided, which saves processing resources. Also, saving information in a form alternate to a conversion value such as an MD5 value requires less space on a storage medium. Further, accuracy and completeness of recording network traffic is not compromised.

Figure 4:
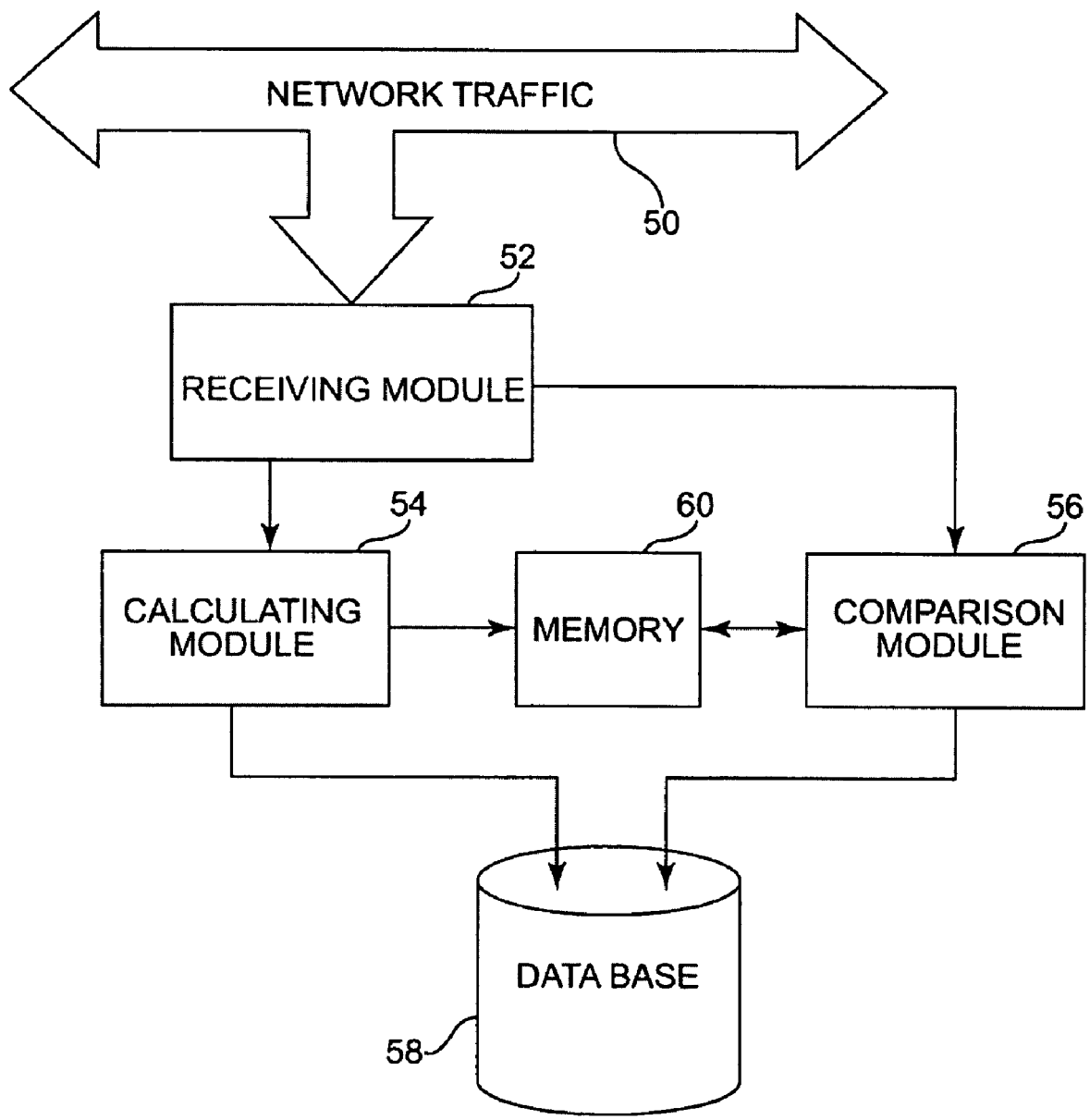
FIG. 4 is a block diagram of a system according to an embodiment of the present disclosure.

FIG. 4 illustrates an example system operating the example methods described above for recording network traffic 50. The system includes a receiving module 52, a calculating module 54, a comparison module 56, a database 58, and a memory 60. Network traffic 50 is provided to a receiving module 52. The receiving module interfaces with a calculating module 54 that is used to determine whether files are to be designated as static or dynamic, and also with a comparison module 56 for files already determined to be static or dynamic. The calculating module 54 calculates a conversion value that can be stored in a database 58. The calculating module also stores the conversion value in a memory 60 that can be mapped to a file identifier. If the file is determined at the comparison module 56 to be static, the conversion value for the file identifier is retrieved from memory 60 and stored in the database 58. If the file is determined to be dynamic, a unique identifier generator, which may be included in the comparison module or as a separate module, creates a unique identifier to be stored in the database 58.

Figure 5:
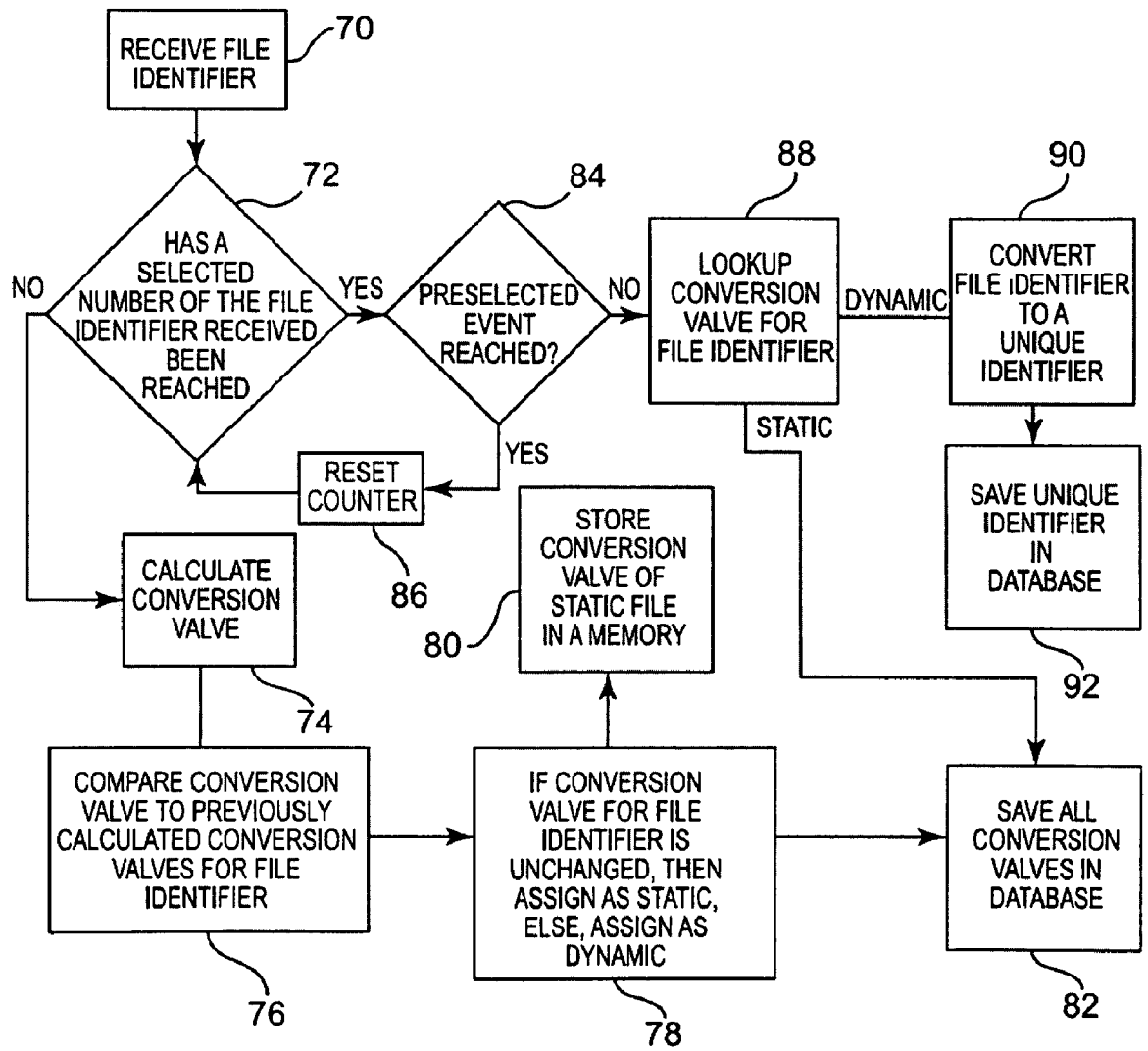
FIG. 5 is a flow chart of an embodiment of the present disclosure.

FIG. 5 illustrates a detailed example of a method for recording network traffic in accordance with the above described example methods and systems. A file in network traffic is received as a file identifier 70, and this file identifier is processed to determine if it is to be calculated into a conversion value or compared to an existing conversion value 72.

This determination can be made based on whether the file identifier has previously been calculated into a conversion value a select number of times. In the case of a file identifier that is to be calculated into a conversion value, a processor can be used to develop a conversion value 74 such as an MD5 value. Once the file identifier has been calculated the select number of times, the conversion values calculated from all of the selected number of times is compared 76. A status of static or dynamic is assigned to the file identifier based on this comparison 78. If, for example, the conversion value remains the same for all of the calculations, the file identifier is considered to be static. If the conversion values change from time to time for all of the calculations, the file identifier is considered to be dynamic. The conversion value for the static files is stored in a memory 80 that can later be accessed without having to perform the calculation again. Also, all of these calculations are in response to actual network traffic and are stored in a database as the corresponding conversion value 82.

Once a file identifier has been calculated the selected number of times so that the status of the file identifier is determined, this status will remain in place until one or more pre-selected events take place. One such pre-selected event can include whether enough time has elapsed since the file identifier was last calculated. In other words, the status of the file can expire after a pre-selected event such as the passing of a selected amount of time. An example can be one-hour of time. If the pre-selected event has occurred 84, then a counter of the selected number of calculations is reset 86 and the calculations are performed again for the file identifier 74. If the pre-selected event or events have not occurred 84, the file identifier proceeds to be compared to existing conversion values.

The file identifier passing through the conditions requiring calculation of the conversion value proceeds to a mapping feature 88. The mapping feature in one example compares the file identifier to list of the conversion values in memory. If the conversion value is found in memory, the file identifier is considered static and the previously calculated conversion value for the file is stored 82, such as in a database. For example, the memory includes a map of file identifiers to MD5 values. If an MD5 value exists for the file identifier, the MD5 value is stored 82. No calculation is necessary, which saves processor resources.

If no conversion value is found, the file identifier is considered dynamic. In this case, the file identifier is converted to a unique identifier value 90, such as a GUID. The unique identifier value is then stored 92, such as in the database. Even though the conversion to a unique identifier may require some processing resources, a conversion to GUID requires significantly less resources than a calculation of an MD5 value.

Figure 6:
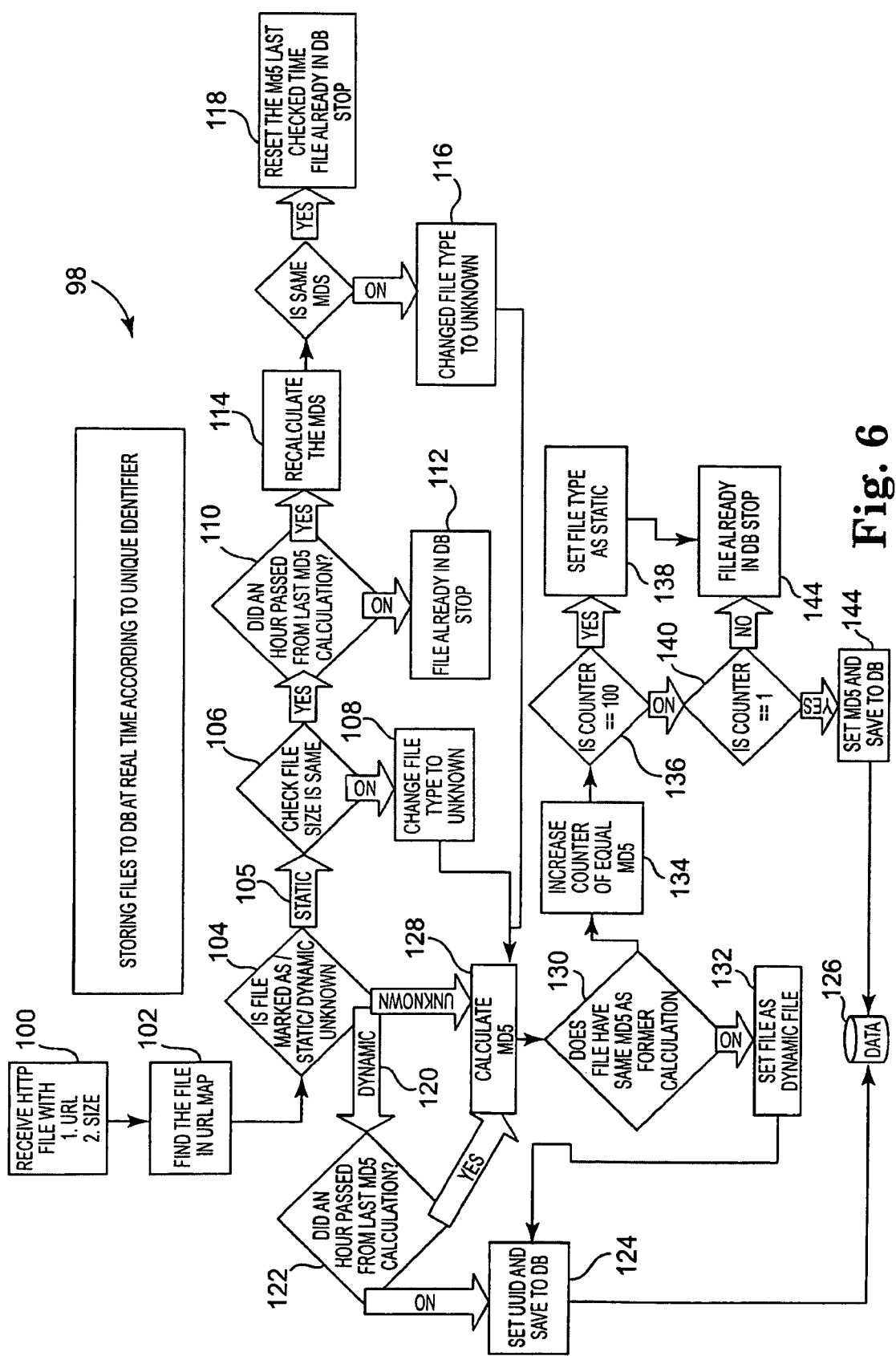
FIG. 6 is a flow chart of an embodiment of the present disclosure.

FIG. 6 is another example 98 of a method for recording data. Several of the features of FIG. 6 are performed out of order compared to those features of FIG. 5. For example, the flow of FIG. 5 starts with looking for a conversion value in the map, and if not found then a conversion value is created. In other examples, the conversion value can be created first. Other features can change, too, between the methods.

In the example 98, a file identifier is received 100. In a further example of the file identifier, it can include information as to the URI and content, as well as the file size. The file identifier is found in the map 102, which can then identify the file identifier as a static, dynamic, or unknown file 104.

One branch of this determination is if the file is static 105. In this branch, the file size is checked to see if it has changed 106. If so, the file type is changed to unknown 108. If not, a pre-selected event such as the passage of time is determined 110. In the example, a determination is made as to whether an hour has passed since the latest conversion value for the file was calculated. If not, the process can stop because the file is already stored 112. If an hour has passed, a conversion value is recalculated 114. If the conversion value has changed from before, the file type is changed to unknown 116. If the file type is the same conversion value, the pre-selected event is reset and the file has already been stored 118.

Another branch is if the file is dynamic 120. Again, a determination is made whether a pre-selected event has occurred 122. If the pre-selected event has not occurred, a unique identifier is determined for the file, and it is saved 124 into database 126. If the pre-selected event has occurred at 122, then the file type is changed to unknown.

In the cases of unknown files, a conversion value, such as an MD5 value, is calculated 128. The conversion value is compared to previously calculated conversion values 130. If the conversion value is different than the previous conversion values, the file is set as dynamic 132, and returns to 124. If the conversion value is the same as a previously calculated conversion value, a counter is increased 134. If a pre-selected amount of calculations are made, as determined by the counter, without a change 136 then the file is determined to be static 138. If a pre-selected amount of calculations are not made, the counter is considered as to whether it is equal to one 140. If not, then the file is already stored in the database 142. If so, then a conversion value is calculated and stored 144 in database 126.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method for recording which files of data are accessed on a server, comprising
   receiving a file identifier indicative of a file accessed on the server;
   calculating a file conversion value from the file identifier by applying a hash function to the file identifier to produce at least a 128 bit file conversion value;
   storing the file conversion value corresponding with the file identifier in memory;
   comparing the file identifier to a plurality of stored file conversion values corresponding with the file identifier, wherein the comparing includes:
      receiving from the memory a set of the plurality of file conversion values calculated from the file identifier for a corresponding repeatedly accessed file;
      determining whether the set of file conversion values are identical to all other file conversion values in the set;
      assigning the accessed file the assigned as a static file if the set of file conversion values are identical to all other file conversion values in the set; and
      assigning the accessed file as a dynamic file if the set of file conversion values are distinguishable from other conversion values in the set;
   subsequent to assigning the accessed file as a static file, mapping the file identifier to the file conversion value in the memory and recording the mapped file conversion value for each access of the static file; and
   subsequent to assigning the accessed file as a dynamic file, calculating a unique identifier from the file identifier and recording the calculated unique identifier for each access of the dynamic file.

2. The method of claim 1 wherein the file identifier includes a universal resource identifier.

3. The method of claim 2 wherein the file identifier further includes a content length of the file.

4. The method of claim 1 wherein the file is a hypertext transfer protocol file.

5. The method of claim 1 wherein the file conversion value is a message-digest algorithm 5 value.

6. The method of claim 1 wherein the file conversion value is not calculated again for each repeated access of a file determined to be static.

7. The method of claim 6 wherein recording the file conversion value is not performed for dynamic files.

8. The method of claim 7 wherein recording includes saving into a database the conversion value for the static file and the unique identifier for the dynamic file.

9. The method of claim 1 wherein the unique identifier is a Global Unique Identifier value.

10. A method for recording network traffic, comprising:
calculating a file conversion value based on a file identifier corresponding to a file transferred on the network by applying a hash function to the file identifier to produce at least a 128 bit file conversion value;
recording the file conversion value of the file identifier for each of a plurality of file transfers of the corresponding file up to a selected number of file transfers;
assigning the file identifier as corresponding with a static file if the plurality of recorded file conversion values of the file identifier are all identical for the file identifier for the selected number of file transfers;
storing the file conversion value in a memory if the file identifier corresponds with a static file;
assigning the file identifier as corresponding with a dynamic file if the plurality of recorded file conversion values of the file identifier are distinguishable from other file conversion values for the file identifier for selected number of file transfers;
subsequent to assigning the file identifier with a static file, mapping the file identifier to the file conversion value in the memory and recording the mapped file conversion value for each repeated transfer of the static file; and
subsequent to assigning the file identifier with a dynamic file, calculating a unique identifier from the file conversion value and recording the calculated unique identifier for each repeated transfer of the dynamic file.

11. The method of claim 10 wherein the assigning the file identifier as corresponding with a static files includes saving the conversion value in a map such that subsequent file transfers of the file identifier are converted to the conversion value without re-calculating the conversion value.

12. The method of claim 11 wherein static and dynamic status of file identifiers are re-assigned in response to a pre-selected event.

13. The method of claim 12 wherein the pre-selected event is an expiration of time.

14. The method of claim 10 wherein the selected number of file transfers is one hundred file transfers of the file identifier and the expiration of time is an expiration of one hour from the one hundredth file transfer of the file identifier.

15. A system for recording network traffic, comprising:
a processor configured to:
receive a file identifier indicative of a file accessed on the server;
calculate a file conversion value from the file identifier by applying a hash function to the file identifier to produce at least a 128 bit file conversion value;
store the file conversion value corresponding with the file identifier in memory;
compare the file identifier to a plurality of stored file conversion values corresponding with the file identifier;
receive from the memory a set of the plurality of file conversion values calculated from the file identifier for a corresponding repeatedly accessed file;
determine whether the set of file conversion values are identical to all other file conversion values in the set;
assign the accessed file the assigned as a static file if the set of file conversion values are identical to all other file conversion values in the set; and
assign the accessed file as a dynamic file if the set of file conversion values are distinguishable from other conversion values in the set;
map the file identifier to the file conversion value in the memory and record the mapped file conversion value for each repeated access of the static file subsequent to the accessed file being assigned as a static file; and
calculate a unique identifier from the file identifier and record the calculated unique identifier for each repeated access of the dynamic file subsequent to the accessed file being assigned as a dynamic file.

16. A non-tangible computer readable storage medium storing computer executable instructions for controlling a computing device to perform a method for recording which files of data are accessed on a server, comprising
receiving a file identifier indicative of a file accessed on the server;
calculating a file conversion value from the file identifier by applying a hash function to the file identifier to produce at least a 128 bit file conversion value;
storing the file conversion value corresponding with the file identifier in memory;
comparing the file identifier to a plurality of stored file conversion values corresponding with the file identifier, wherein the comparing includes,
receiving from the memory a set of the plurality of file conversion values calculated from the file identifier for a corresponding repeatedly accessed file;
determining whether the set of file conversion values are identical to all other file conversion values in the set;
assigning the accessed file the assigned as a static file if the set of file conversion values are identical to all other file conversion values in the set; and
assigning the accessed file as a dynamic file if the set of file conversion values are distinguishable from other conversion values in the set;
subsequent to assigning the accessed file as a static file, mapping the file identifier to the file conversion value in the memory and recording the mapped file conversion value for each access of the static file; and
subsequent to assigning the accessed file as a dynamic file, calculating a unique identifier from the file identifier and recording the calculated unique identifier for each access of the dynamic file.

* * * * *